US009733020B2

(12) United States Patent
Gardin

(10) Patent No.: US 9,733,020 B2
(45) Date of Patent: Aug. 15, 2017

(54) PRESSURE VESSEL AND METHOD FOR COOLING A PRESSURE VESSEL

(75) Inventor: Mats Gardin, Vasteras (SE)

(73) Assignee: Quintus Technologies AB, Vasteras (SE)

( * ) Notice: Subject to any disclaimer, the term of this patent is extended or adjusted under 35 U.S.C. 154(b) by 658 days.

(21) Appl. No.: 13/988,573

(22) PCT Filed: Nov. 26, 2010

(86) PCT No.: PCT/EP2010/068305
§ 371 (c)(1), (2), (4) Date: Sep. 11, 2013

(87) PCT Pub. No.: WO2012/069090
PCT Pub. Date: May 31, 2012

(65) Prior Publication Data
US 2013/0344451 A1 Dec. 26, 2013

(51) Int. Cl.
*B29C 43/10* (2006.01)
*F27D 7/04* (2006.01)
(Continued)

(52) U.S. Cl.
CPC .................. *F27D 7/04* (2013.01); *B22F 3/15* (2013.01); *B30B 11/002* (2013.01); *B22F 2003/153* (2013.01)

(58) Field of Classification Search
CPC ..... B30B 11/002; B22F 3/15; B22F 2003/153
(Continued)

(56) References Cited

U.S. PATENT DOCUMENTS 4,235,592 A 11/1980 Smith et al.
7,011,510 B2 * 3/2006 Nakai ...................... B22F 3/15 425/405.1

(Continued)

FOREIGN PATENT DOCUMENTS

JP 1-230984 A 9/1989
JP 2007263463 A2 10/2007
WO WO 97/20652 A1 6/1997

OTHER PUBLICATIONS

International Search Report from corresponding patent application PCT/EP2010/068305, date mailed—Oct. 7, 2011, pp. 1-3.

(Continued)

*Primary Examiner* — Joseph S Del Sole
*Assistant Examiner* — Thukhanh T Nguyen
(74) *Attorney, Agent, or Firm* — Wolf, Greenfield & Sacks, P.C.

(57) ABSTRACT

The present invention relates to an arrangement for treatment of articles by hot pressing and preferably by hot isostatic pressing. In particular, the present invention relates to such an arrangement capable of obtaining a rapid rate without the need of special purpose valves for the cooling. A furnace chamber is provided inside the pressure vessel of the arrangement and a heat insulated casing arranged to surround the furnace chamber. A bottom insulating portion is arranged beneath the furnace chamber. Further, a fan having a controllable number of revolutions for circulating the pressure medium within the furnace chamber is arranged in the pressure vessel, and preferable within the furnace chamber. At least one feeding passage is arranged to allow feeding of pressure medium from a region being colder than a region within the furnace chamber towards an inlet of the fan, wherein an amount of pressure medium being fed to the
(Continued)

inlet of the fan can be controlled by adjusting operational parameters of the fan.

10 Claims, 8 Drawing Sheets

(51) Int. Cl.
*B30B 11/00* (2006.01)
*B22F 3/15* (2006.01)

(58) Field of Classification Search
USPC .... 425/78, 170, 199, 405.1, 405.2, 210, 815
See application file for complete search history.

(56) References Cited

U.S. PATENT DOCUMENTS

| | | | | |
|---|---|---|---|---|
| 7,687,024 | B2 * | 3/2010 | Bergman | B30B 11/001 419/25 |
| 2007/0228596 | A1 | 10/2007 | Fujikawa | |

OTHER PUBLICATIONS

English Translation of Office Action in corresponding Japanese Patent Application No. JP-2013-540245, dated Jun. 23, 2015, pp. 1-8.

* cited by examiner

PRESSURE VESSEL AND METHOD FOR COOLING A PRESSURE VESSEL

CROSS-REFERENCES TO RELATED APPLICATIONS

The present application is the national phase of International Application No. PCT/EP2010/068305, titled "PRESSURE VESSEL AND METHOD FOR COOLING A PRESSURE VESSEL," filed on Nov. 26, 2010, which is hereby incorporated by reference in its entirety.

TECHNICAL FIELD OF THE INVENTION

The present invention relates to an arrangement for treatment of articles by hot pressing and preferably by hot isostatic pressing. In particular, the present invention relates to a pressing arrangement for treatment of articles by hot pressing, and preferably hot isostatic pressing, capable of providing a controlled, rapid cooling rate without the need of any special purpose valves for the cooling.

BACKGROUND OF THE INVENTION

Hot isostatic pressing (HIP) is a technology that finds more and more widespread use. Hot isostatic pressing is for instance used in achieving elimination of porosity in castings, such as for instance turbine blades, in order to substantially increase their service life and strength, in particular the fatigue strength. Another field of application is the manufacture of products, which are required to be fully dense and to have pore-free surfaces, by means of compressing powder.

In hot isostatic pressing, an article to be subjected to treatment by pressing is positioned in a load compartment of an insulated pressure vessel. A cycle, or treatment cycle, comprises the steps of: loading, treatment and unloading of articles, and the overall duration of the cycle is herein referred to as the cycle time. The treatment may, in turn, be divided into several portions, or states, such as a pressing state, a heating state, and a cooling state.

After loading, the vessel is sealed off and a pressure medium is introduced into the pressure vessel and the load compartment thereof. The pressure and temperature of the pressure medium is then increased, such that the article is subjected to an increased pressure and an increased temperature during a selected period of time. The temperature increase of the pressure medium, and thereby of the articles, is provided by means of a heating element or furnace arranged in a furnace chamber of the pressure vessel. The pressures, temperatures and treatment times are of course dependent on many factors, such as the material properties of the treated article, the field of application, and required quality of the treated article. The pressures and temperatures in hot isostatic pressing may typically range from 200 to 5000 bars, preferably from 800 to 2000 bars and from 300° C. to 3000° C., preferably from 800° C. to 2000° C., respectively.

When the pressing of the articles is finished, the articles often need to be cooled before being removed, or unloaded, from the pressure vessel. In many kinds of metallurgical treatment, the cooling rate will affect the metallurgical properties. For example, thermal stress (or temperature stress) and grain growth should be minimized in order to obtain a high quality material. Thus, it is desired to cool the material homogeneously and, if possible, to control the cooling rate. Many presses known in the art suffer from slow cooling of the articles and efforts have therefore been made to reduce the cooling time of the articles. Notwithstanding the fact that a reduced cooling time is an important factor to take into account, high temperature uniformity during, for example, a steady-state state and a pressing state is also considerable importance. Thus, in addition to the capability of rapid cooling, a capability of achieving a high temperature uniformity during, for example, the steady-state state is desired.

Mechanical means for forcing a convective circulation may be applied to obtain an enhanced cooling rate. This is a way to achieve rapid cooling of treated articles although these are contained in a well insulated furnace chamber. Co-pending application PCT/EP2007/10997 discloses a hot isostatic pressing arrangement with these characteristics. Devices for forcing convection in high-pressure and/or high-temperature systems are however often subject to early wear or frequent machinery breakdown. This is in particular true of mechanical fans or ventilators with moving parts. Accordingly, such pressing arrangements may require relative frequent maintenance resulting in undesired production disruptions and stops.

Furthermore, the available space for loading articles in pressing arrangement is often limited and mechanical means such as fans or ventilators decrease this available space, a problem that is even more pronounced in smaller pressing arrangements.

The use of mechanical means also entails a relatively complex and expensive construction of the pressing arrangement.

Hence, there is still a need within the art of improved pressing arrangements capable of controlled, rapid cooling during a cooling state and of high temperature uniformity during steady-state and pressing.

SUMMARY OF THE INVENTION

A general object of the present invention is to provide an improved pressing arrangement for hot pressing, and preferably hot isostatic pressing, capable of an accurate control of the temperature and a rate of change of the temperature of the pressure medium and of articles being treated within the pressing arrangement.

A more specific object of the present invention is to provide an improved pressing arrangement for hot pressing, and preferably hot isostatic pressing, capable of controlled, rapid cooling rate during a cooling state and of high temperature uniformity during e.g. steady-state and a pressing state.

Another object of the present invention is to provide an improved pressing arrangement for hot pressing, and preferably hot isostatic pressing, having a construction with reduced constructional complexity and reduced maintenance requirements.

A further object of the present invention is to provide an improved pressing arrangement for hot pressing, and preferably hot isostatic pressing, capable of achieving a circulation of pressure medium within the furnace chamber without cooling to create high temperature uniformity during e.g. steady-state and a pressing state.

Yet another object of the present invention is to provide an improved pressing arrangement for hot pressing, and preferably hot isostatic pressing, capable of achieving a controlled and rapid cooling rate of articles and/or pressure medium without the need of any special purpose valves for the cooling equipment.

These and other objects of the present invention are achieved by means of a pressure vessel and method for such vessel having the features defined in the independent claims. Embodiments of the present invention are characterized in the dependent claims.

In the context of the present invention, the terms “cold” and “hot” or “warm” (e.g. cold and warm or hot pressure medium or cold and warm or hot temperature) should be interpreted in a sense of average temperature within the pressure vessel. Similarly, the term “low” and high” temperature should also be interpreted in a sense of average temperature within the pressure vessel.

According to a first aspect of the invention, there is provided a pressing arrangement for hot pressing comprising pressure vessel including a furnace chamber adapted to hold articles. A heat insulated casing is arranged to surround the furnace chamber. Further, a bottom insulating portion is arranged beneath the furnace chamber. A fan having an adjustable number of revolutions (rpm) is arranged to provide a flow of pressure medium into the furnace chamber and a circulation of the pressure medium within the furnace chamber when operated. At least one feeding passage is arranged to provide a connection between a region being colder than a region within the furnace chamber and an inlet of the fan so as to enable a flow of pressure medium from the cold region to the inlet for mixing the cold flow with a flow of warm pressure medium into the furnace chamber, wherein the amount of the flow of cold pressure medium being fed to the inlet of the fan can be controlled by adjusting the number of revolutions of the fan.

According to a second aspect of the present invention, there is provided a method for a pressing arrangement for hot pressing. The pressing arrangement comprises a pressure vessel including a furnace chamber adapted to hold articles, which furnace chamber is provided inside the pressure vessel, a heat insulated casing arranged to surround the furnace chamber, a bottom insulating portion arranged beneath the furnace chamber, and a fan having an adjustable number of revolutions, the fan being arranged to provide a flow of pressure medium into the furnace chamber and a circulation of the pressure medium within the furnace chamber when operated. At least one feeding passage is arranged to provide a connection between a region being colder than a region within the furnace chamber and an inlet of the fan. The method comprises adjusting the number of revolutions of the fan to control a flow of pressure medium from the cold region to the inlet of the fan where the cold flow is mixed with a flow of warm pressure medium and which mixed flow is then fed into the furnace chamber.

Thus, the capability of the fan to create a circulation effect with warm pressure medium or to create a cooling effect within the furnace chamber can be adjusted. By regulating or controlling the fan, the flow of cold pressure medium through the feeding passage from the cold region beneath the bottom insulation portion towards the inlet of the fan can be controlled, a suction effect at the inlet of the fan and a flow of pressure medium into the furnace chamber can be controlled. Consequently, a cooling state can be controlled and, if desired, the flow of pressure medium can be substantially impeded to achieve a steady-state state, wherein a circulation of pressure medium is maintained within the furnace chamber to obtain a uniform temperature in the hot zone.

The present invention is hence based on the insight that the large and significant density differences of the pressure medium that occur within a pressing vessel for hot pressing and, in particular, for hot isostatic pressing, can be utilized to obtain an accurate control of the cooling rate of articles being pressed. These large density differences are created by the high pressures and temperatures differences of the pressure vessel in such an arrangement. Often, such a pressing arrangement operates at pressures ranging from 200 to 5000 bars, and preferably between 800 and 2000 bars and at temperatures ranging from 300° C. to 3000° C., and preferably between 800 and 2000° C.

Further, the present invention is based on the insight that a fan can be used to control the cooling rate accurately in order to, for example, obtain a desired cooling rate by utilizing this large density difference. The present invention can also be used for state control, i.e. whether steady-state or cooling is applied, by utilizing the density differences while running the fan. This can be achieved without using any special purpose valves for the cooling. More specifically, at least one feeding passage is arranged to enable a feeding of pressure medium from a cold region beneath the bottom insulation portion towards an inlet of the fan, which fan preferably is arranged in a lower end of the furnace chamber where the pressure medium is significantly warmer than the cold region. Often the temperature difference between the cold region beneath the bottom insulation portion and the furnace chamber may be 1000° C. or even more. Thus, there exists a large density difference between these two regions, which, according to the present invention, is utilized to achieve a pressing arrangement capable of an accurately regulated or controlled cooling state whereby a desired cooling rate or maintaining a steady-state condition can be obtained by controlling the number of revolutions of the fan. At steady-state, the fan is operated at a number of revolutions such that a flow of warm pressure medium is circulated in the furnace chamber without the addition of a flow of cold pressure medium via the feeding passage from the cold region below the bottom insulating portion. At a certain number of revolutions of the fan, cold pressure medium starts to flow out from the feeding passage under given temperature and pressure conditions within the pressure chamber, e.g. at a given temperature difference between the warm region in furnace chamber and the cold region below the bottom insulating portion and at a given pressure within the pressure vessel. The cold pressure medium is mixed with the flow of warm pressure medium and is fed into the furnace chamber by the fan, and thereby a controlled and variable cooling can be achieved.

If the fan is operated at a number of revolutions being lower than this certain limit number, the feeding passage is substantially closed for feeding and accordingly the flow of cold pressure medium from the cold region below the bottom insulating portion is shut off. That is, the pressure difference between the region beneath the bottom insulation portion and the passage above the bottom insulation portion is too low to create a sufficient suction effect that would draw pressure medium through the feeding passage. Under these conditions, a steady-state is maintained and a flow of warm pressure medium is circulated through the furnace chamber without the addition of the flow of cold pressure medium.

On the other hand, if the fan is operated above this certain limit number of revolutions, a higher pressure difference is created, which, in turn, forces pressure medium to flow through the feeding passage. Accordingly, a flow of cold pressure medium is created in addition to the flow of the warm pressure medium. Consequently, by operating the fan at different number of revolutions above the certain limit number of revolutions, it is possible to control the amount of cold pressure medium being fed to the inlet of the fan during a cooling state and thereby control the cooling rate. Further, if steady state is desired, it is possible to shut-off or close the feeding of pressure medium, which is achieved by operating the fan at lower number of revolutions below the certain limit number of revolutions.

The certain limit number of revolutions where a steady-state state turns into a cooling state is determined by a number of parameters. A non-exhaustive list includes:

- The density difference between the pressure medium above the bottom insulation portion and the pressure medium in the region beneath the bottom insulation portion.
- The arrangement of the feeding passage and its outlet relative, radially and vertically, to
  - the fan;
  - the passage between the bottom insulation portion and furnace chamber;
  - an inlet of a guiding passage between a heat insulating portion and a housing of the heat insulating casing; and/or
  - an upper surface of the bottom insulation portion.
- The dimensions of the feeding passage, in particular, the diameter of the feeding passage.
- The number of feeding passages.

According to embodiments of the present invention, which may combined with one or more of other embodiments described herein, the fan is thus configured such that operation at a number of revolutions below the certain limit number of revolutions results in that the flow of cold pressure medium is shut off.

According to embodiments of the present invention, which may combined with one or more of other embodiments described herein, the fan is hence configured such that operation at a variable number of revolutions above the certain limit number of revolutions results in a variable flow of cold pressure medium towards the inlet of the fan.

In embodiments of the present invention, which may combined with one or more of other embodiments described herein, the at least one feeding passage is thus arranged with dimensions such that the fan and the at least one feeding passage co-operate to achieve a substantial cut off of the flow of pressure medium and the variable flow of cold pressure medium.

According to embodiments of the present invention, which may combined with one or more of other embodiments described herein, the at least one feeding passage is hence arranged with an outlet located at a radial and vertical distance relative to the fan such that the fan and the at least one feeding passage co-operate to achieve the substantial cut off of the flow of cold pressure medium and the variable flow of cold pressure medium.

In embodiments of the present invention, which may be combined with one or more of other embodiments described herein, the outlet of the at least one feeding passage is located at a radial and vertical distance from an inlet of a guiding passage in the heat insulated casing such that the at least one feeding passage and the inlet of the guiding passage co-operate to achieve the substantial cut off of the flow of cold pressure medium and the variable flow of cold pressure medium.

According to embodiments of the present invention, which can be combined with one or more of other embodiments described herein, the at least one feeding passage is at least one conduit is arranged in the bottom insulating portion at a radial distance from a the fan and wherein an outlet of the conduit is located in connection to a passage above the bottom insulating portion.

In embodiments of the present invention, which may be combined with one or more of other embodiments described herein, the at least one conduit is arranged to extend into the passage such that the outlet is located at a distance from the bottom insulation portion.

According to embodiments of the present invention, which may be combined with one or more of other embodiments described herein, the at least one feeding passage is arranged such that an outlet is located in connection to a central passage for supplying pressure medium to the fan.

In embodiments of the present invention, which may combined with one or more of other embodiments described herein, the support means for supporting a load compartment within the furnace chamber is arranged such that pressure medium is allowed to flow into the passage above the bottom insulation portion.

According to embodiments of the present invention, which may be combined with one or more of other embodiments described herein, the support means is provided with through holes arranged to allow pressure medium is allowed to flow into the passage above the bottom insulation portion.

In embodiments of the present invention, which may be combined with one or more of other embodiments described herein, the feeding passage is provided with a valve.

Other objectives, features and advantages of the present invention will appear from the following detailed description, the attached dependent claims, and from the appended drawings.

BRIEF DESCRIPTION OF THE DRAWINGS

The various aspects of the invention, including its particular features and advantages, will be readily understood from the following detailed description and the accompanying drawings. In the following Figures, like reference numerals denote like elements or features of embodiments of the present invention throughout. Further, reference numerals for symmetrically located items, elements or feature indicators are only denoted once in the Figures. On the drawings.

DETAILED DESCRIPTION OF EMBODIMENTS

Figure 1:
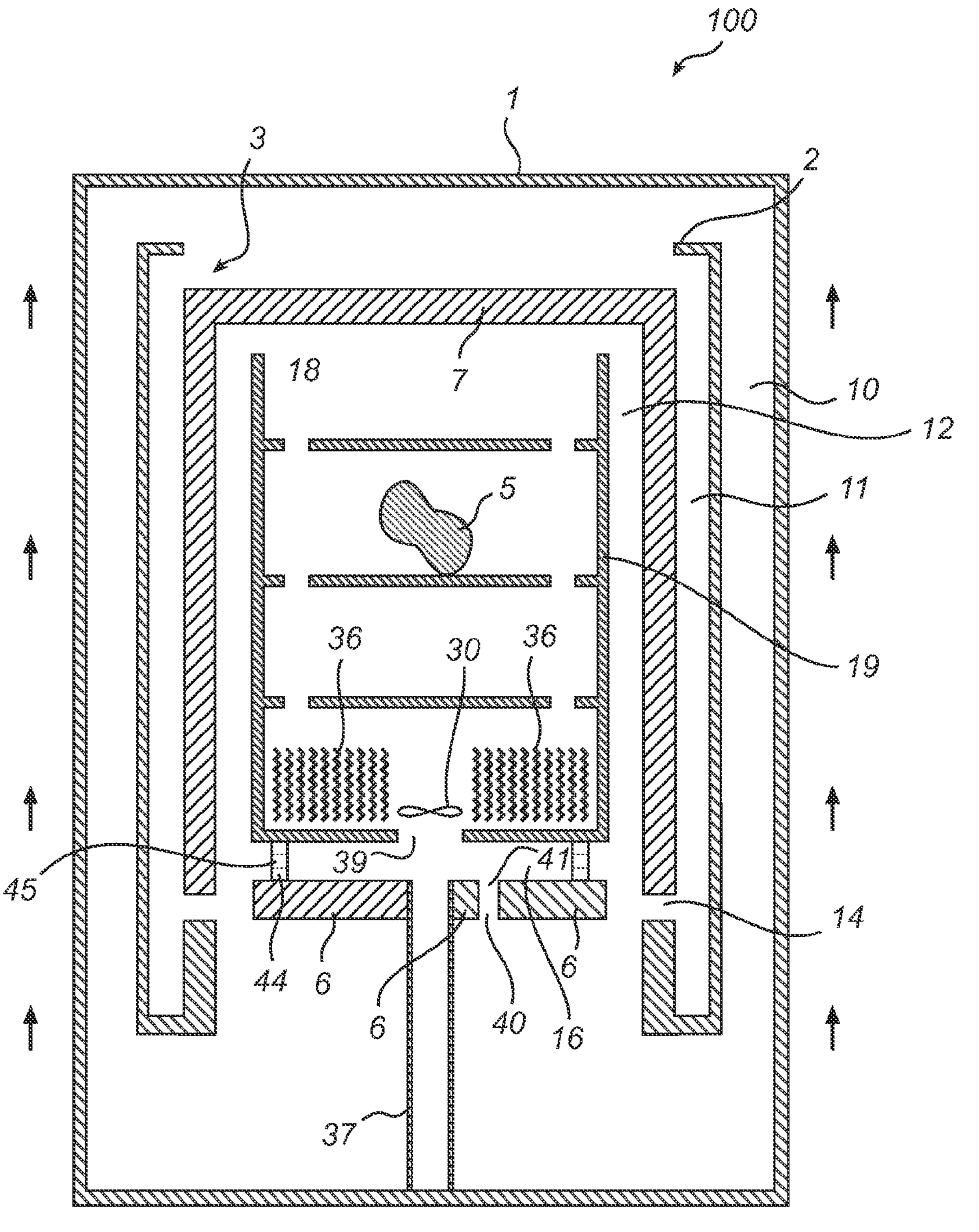
FIG. 1 shows a schematical side view of a pressing arrangement according to an embodiment of the present invention.

The following is a description of exemplifying embodiments of the present invention. This description is intended for the purpose of explanation only and is not to be taken in a limiting sense. It should be noted that the drawings are schematic and that the pressing arrangements of the described embodiments may comprise features and elements that are, for the sake of simplicity, not indicated in the drawings.

Embodiments of the pressing arrangement according to the present invention may be used to treat articles made from a number of different possible materials by pressing, in particular by hot isostatic pressing.

FIG. 1 shows a pressing arrangement 100 according to an embodiment of the invention. The pressing arrangement 100, which is intended to be used for pressing of articles, comprises a pressure vessel 1 with means (not shown), such as one or more ports, inlets and outlets, for supplying and discharging a pressure medium. The pressure medium may be a liquid or gaseous medium with low chemical affinity in relation to the articles to be treated. The pressure vessel 1 includes a furnace chamber 18, which comprises a furnace (or heater) 36, or heating elements, for heating of the pressure medium during the pressing state of the treatment cycle. The furnace 36 may, as shown in for example FIG. 1, be located at the lower portion of the furnace chamber 18, or may be located at the sides of the furnace chamber 18. The person skilled in the art realises that it is also possible to combine heating elements at the sides with heating elements at the bottom so as to achieve a furnace which is located at the sides and at the bottom of the furnace chamber. Clearly, any implementation of the furnace regarding placement of heating elements, known in the art, may be applied to the embodiments shown herein. It is to be noted that the term “furnace” refers to the means for heating, while the term “furnace chamber” refers to the volume in which load and furnace are located. The furnace chamber 18 does not occupy the entire pressure vessel 1, but leaves guiding passage 10 around it. During normal operation of the pressing arrangement 100, the guiding passage 10 is typically cooler than the furnace chamber 18 but is at equal pressure.

The furnace chamber 18 further includes a load compartment 19 for receiving and holding articles 5 to be treated. The load compartment 19 rests upon support means 44, which support means may be, for example, a number of pillar-like elements or a ring shaped element provided with through holes 45 for allowing passage of warm pressure medium for circulation into the furnace chamber 18.

The furnace chamber 18 is surrounded by a heat insulated casing 3. The heat insulated casing 3 comprises a heat insulating portion 7 and a housing 2 arranged to surround the heat insulating portion 7, which thermally seals off the interior of the pressure vessel 1 in order to reduce heat loss. A first guiding passage 10 is formed between the inside of the outer walls of the pressure vessel 1 and the housing 2. The first guiding passage 10 is used to guide the pressure medium from the top of the pressure vessel 1 to the bottom thereof.

Moreover, a second guiding passage 11 is formed between the housing 2 of the furnace chamber 18 and the heat insulating portion 7 of the furnace chamber 18. The second guiding passage 11 is used to guide the pressure medium towards the top of the pressure vessel. The second guiding passage 11 is provided with one or more inlets 14 for supplying pressure medium thereto, as well as an opening 13 at the top of the pressure vessel for allowing flow of the pressure medium into the first guiding passage 10.

The inlets 14 are preferably located below the upper edge of the lower heat insulating portion 6. An outer convection loop is thereby formed by the first and second guiding passages 10, 11 as well as in a lower portion, below the bottom insulating portion 6, of the pressure vessel 1.

A fan 30 having a controllable number of revolutions is arranged at a lower end of the furnace chamber 18 for providing a circulation the pressure medium within the furnace chamber 18. By operating the fan 30 an inner convection loop can be enhanced, in which inner convection loop pressure medium has a flow through a passage 16, an upward flow through the load compartment 19 and a downward flow along a peripheral portion 12 of the furnace chamber 18. As will be explained in detail below, an additional flow of cold pressure medium into the furnace chamber 18 from a region below the bottom of the casing 3 can be achieved by operating the fan 30 above a certain limit number of revolutions.

The bottom of the casing 3 comprises a bottom insulating portion 6. The bottom insulating portion 6 may be provided with a central passage 37 for supplying pressure medium to the fan 30 and further into the furnace chamber 18.

Moreover, the outer wall of the pressure vessel 1 may be provided with channels or tubes (not shown), in which a coolant for cooling may be provided. In this manner, the vessel wall may be cooled in order to protect it from detrimental heat. The coolant is preferably water, but other coolants are also contemplated. The flow of coolant is indicated in FIG. 1 by the arrows on the outside of the pressure vessel.

Even though it is not shown in the figures, the pressure vessel 1 may be opened, such that the articles within the pressure vessel 1 can be removed. This may be realized in a number of different manners, all of which being apparent to a man skilled in the art.

Furthermore, at least one feeding conduit or passage 40 is arranged for allowing a flow of cold pressure medium towards an inlet or intake 39 of the fan 30 from the cold region 42 beneath the bottom insulating portion 6 utilizing the density difference between the pressure medium in the cold region 42 and the pressure medium of the passage 16. As the amount of cold pressure medium being fed from the cold region 42 to the fan 30 can be controlled by means of adjusting the number of revolutions of the fan 30. At a low number of revolutions below a certain limit number of revolutions, the flow of cold pressure medium through the feeding passage 40 is shut off and thus no cold pressure medium will be fed to the fan 30 from the cold region 42 via the passage 40. This is because of the relatively low underpressure at the outlet 41 of the conduit 40. That is, the underpressure is too low to create a sufficient suction effect which would force or draw pressure medium from the cold region 42 upwards through the conduit 40 and further towards the fan 30. At a certain number of revolutions of the fan 30, pressure medium from the cold region 42 commences to flow out from the conduit towards to inlet 39 of the fan 30. This certain number of revolutions depends, inter alia, on a density difference between the pressure medium flowing in the passage 16 and the pressure medium in the region 42, the specific radial location of the conduit 40 relative to the fan 30 (which fan 30 preferably is placed at a central axis CA of the pressure vessel 1) when the conduit 40 is arranged in the bottom insulating portion 6, and the design of the conduit 40 including e.g. diameter of the conduit and the position of the outlet 41 of the conduit 40 relative to the bottom insulation portion 6 and relative to the outlet 14. This certain number of revolutions is defined as a limit number of revolutions of the fan 30. Consequently, if the fan 30 is operated at or above the certain limit number of revolutions, a cooling can be achieved by means of the additional flow of cold pressure medium that is feed or drawn through the conduit 40 and further to the fan 30 from the cold region 42, which, in turn, achieves a mixing of the cold pressure medium and the flow of warm pressure medium. The mixed flow is fed into the furnace chamber 18 (this is described below with reference to FIG. 3) and provides a cooling effect.

In the embodiment shown in FIG. 1, the feeding conduit 40 is arranged in the bottom insulating portion 6 so as to feed or guide cold pressure medium from the cold region 42, where the pressure medium may have an approximate temperature of 60-180° C., towards the inlet or intake fan 30, which is arranged in the furnace chamber 18 where the pressure medium may have an approximate temperature of 1200° C. In FIGS. 5-8, further embodiments of the present invention having different locations of and arrangements of the feeding conduit are illustrated and with reference to these figures the embodiments will be discussed below.

Operation of an exemplary pressing arrangement in accordance with the present invention will now be described generally with reference to FIGS. 2 and 3.

As will be described in the following, a treatment cycle may comprise several states, such as loading state, pressing and/or heating state, cooling state, in which, according to the present invention, a cooling rate can be controlled by the adjusting a number of revolutions of the fan 30 to vary a flow of cold pressure medium into the furnace chamber 18, and unloading state.

First, the pressure vessel 1 is opened such that the furnace chamber 18, and the load compartment 19 thereof, may be accessed. This can be accomplished in a number of different manners known in the art and no further description thereof is required for understanding the principles of the invention.

Then, the articles to be pressed are positioned in the load compartment 19 and the pressure vessel 1 is closed.

When the articles have been positioned in the load compartment 19 of the pressure vessel 1, pressure medium is fed into the pressure vessel 1, for instance by means of a compressor, a pressurized storage tank (a pressure supply), a cryogenic pump, or the like. The feeding of pressure medium into the pressure vessel 1 continues until a desired pressure is obtained inside the pressure vessel 1.

While, or after, feeding pressure medium into the pressure vessel 1, the furnace (the heating elements) 36 of the furnace chamber 18 is (are) activated and the temperature inside the load compartment is increased. If needed, the feeding of pressure medium continues and the pressure is increased until a pressure level has been obtained that is below the desired pressure for the pressing process, and at a temperature below the desired pressing temperature. Then, the pressure is increased the final amount by increasing the temperature in the furnace chamber 18, such that the desired level of the pressure is reached. Alternatively, the desired temperature and level of pressure is reached simultaneously or the desired pressure is reached after the desired temperature has been reached. A man skilled in the art realizes that any suitable method known in the art may be utilized to reach the desired pressing pressure and temperature. For instance, it is possible to equalize the pressure in the pressure vessel and a high pressure supply, and to then further pressurize the pressure vessel, by means of compressors, and further heat the pressure medium at the same time. An inner convention loop may be activated by the fan 30 included in the furnace chamber 18 in order to achieve an even temperature distribution.

In accordance with the embodiments described herein, the desired pressure is above approximately 200 bars, and the desired temperature is above approximately 400° C., for example, about 1200° C.

After a selected time period at which the temperature and pressure is maintained, i.e. the actual pressing state, the temperature of the pressure medium is to be decreased, i.e. cooling is initiated, as will be described below.

The pressure medium used during the pressing state can, when the temperature has been decreased enough in the cooling state, be discharged from the pressure vessel 1. For some pressure mediums, it may be convenient to discharge the pressure medium into a tank or the like for recycling.

After decompression, the pressure vessel 1 is opened such that the pressed articles 5 may be unloaded from the load compartment 19.

Figure 2:
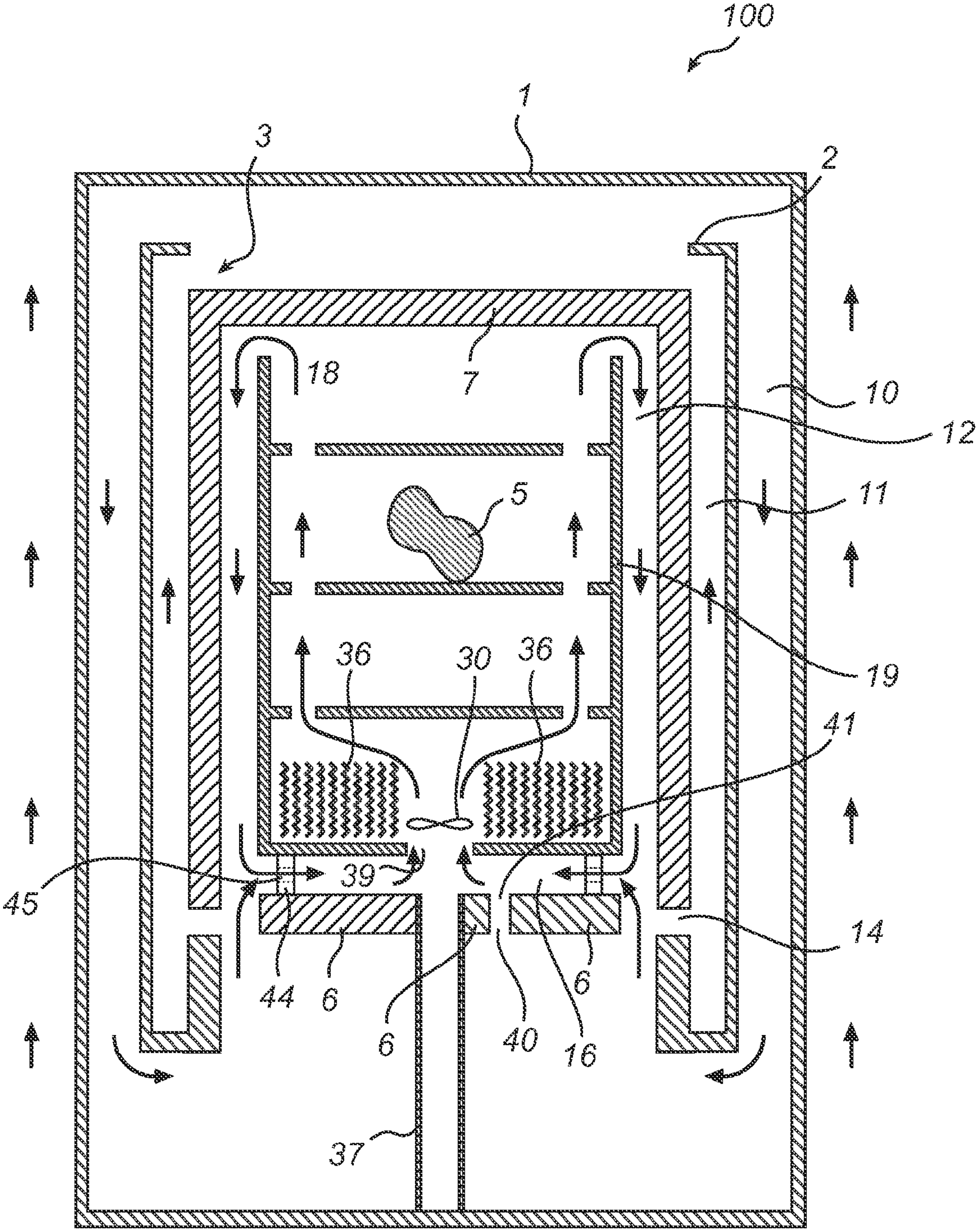
FIG. 2 shows a schematical side view of the pressing arrangement of FIG. 1 during steady-state.
Figure 3:
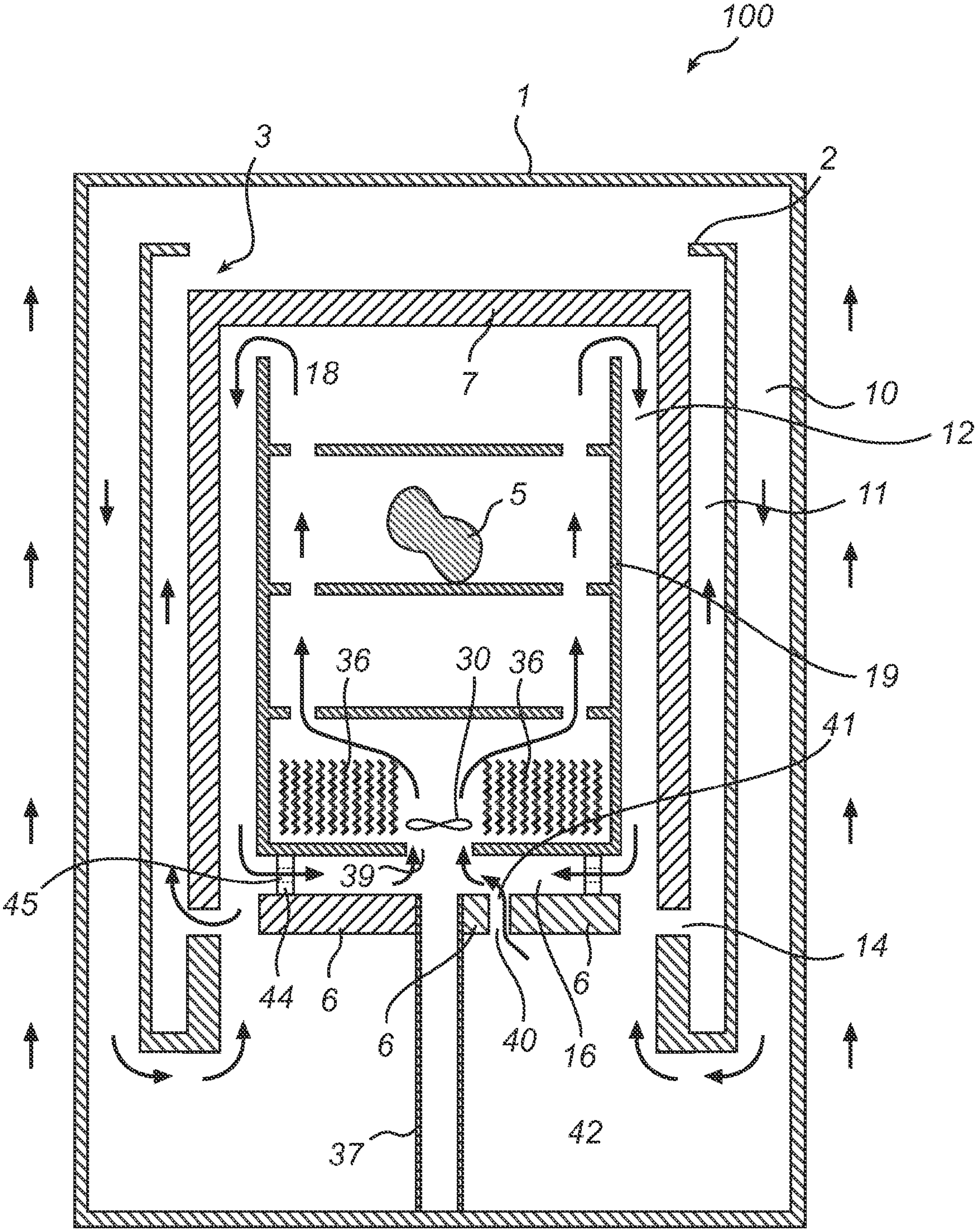
FIG. 3 shows a schematical side view of the pressing arrangement of FIG. 1 during a cooling state.

With reference now to FIGS. 2 and 3, a steady-state state and a cooling state, will be explained in more detail. The discussion below is related to the embodiment of the present invention illustrated in FIG. 1. Again the terms "hot" or "warm" and "cold" are to be interpreted in relation to an average temperature of the pressure medium within the pressure vessel. Further, the arrows indicate the flow direction of the pressure medium.

First, turning to FIG. 2, the flow directions of the pressure medium during steady-state are illustrated by means of arrows. As can be seen, pressure medium that has passed downwards through the peripheral portion 12 of the furnace chamber 18 and through the passage 10 enters into the passage 16 above the bottom insulation portion 6 and is further circulated into the furnace chamber 18 by means of the fan 30 or flows through the inlet 14 into the passage 11. The pressure medium in the region 42 is cold and may have an approximate temperature of 60-180° C., while the pressure medium flowing in the passage 16 is warm and may have an approximate temperature of 1200° C., hence entailing a significant density difference between pressure medium in these two regions. During a steady-state state, the fan 30 is operated with a number of revolutions below the limit number of revolutions discussed above and, accordingly, no additional flow of cold pressure medium is fed to the fan 30 via the feeding passage 40 from the cold region 42. Thereby, high temperature uniformity can be achieved within the furnace 18.

In FIG. 3, a cooling state where cold pressure medium is fed from the cold region 42 to mix with the flow of warm pressure medium so as to obtain a cooling is illustrated. By controlling the number of revolutions of the fan 30, or the number of revolutions, above the certain limit number of revolutions, the feeding of cold pressure medium can be controlled in accurate way. Thereby, it is possible to achieve a desired cooling rate of, for example, the article 5. Given a certain set of parameters, as discussed above, that influences the certain limit number of revolutions, a cooling rate can be accurately controlled by varying the number of revolutions of the fan and thereby, in turn, the amount of cold pressure medium being fed into the furnace chamber 18.

Figure 4:
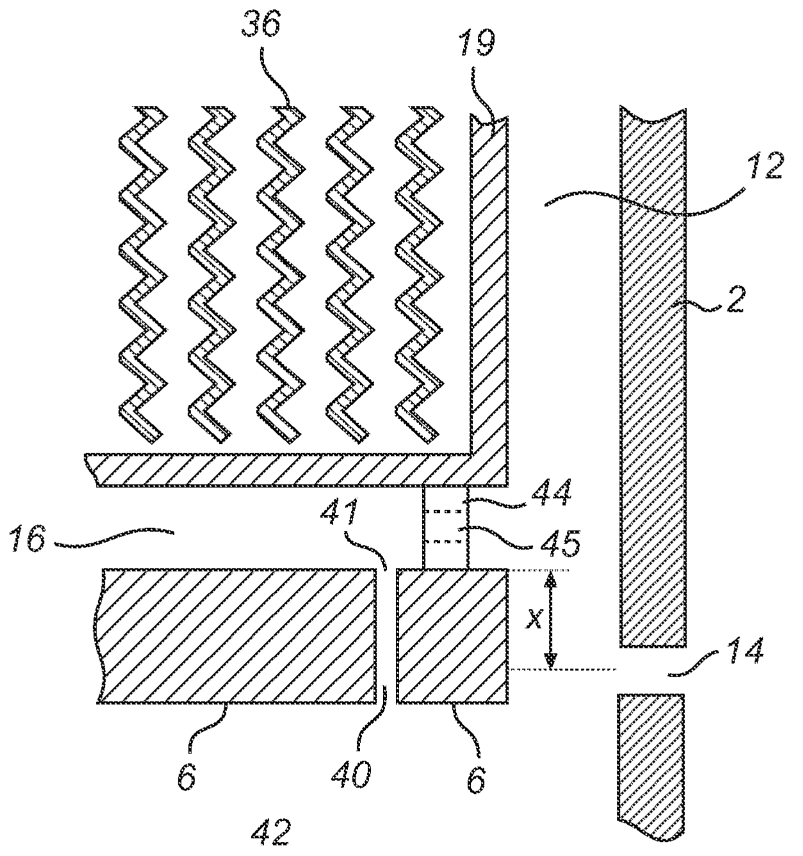
FIG. 4 schematically illustrates a detail view of a pressing arrangement according to the present invention.

As illustrated in FIG. 3, pressure medium that has passed downwards through the peripheral portion 12 of the furnace chamber 18 and through the passage 10 enters into the passage 16 above the bottom insulation portion 6 and is further circulated into the furnace chamber 18 by means of the fan 30 or flows through the inlet 14 into the passage 11. The pressure medium in the region 42 has a low temperature, an approximate temperature of 60-180° C., while the pressure medium flowing in the passage 16 is warm, e.g. an approximate temperature of 1200° C. The pressure medium in the region 42 beneath the bottom insulation portion 6 has a significantly higher density than the pressure medium in the passage 16 above the bottom insulation portion 6, e.g. in the magnitude of about 3 times higher. A sufficient pressure difference between the region 42 and the passage 16 at the outlet 41 is required in order to create a flow of pressure medium through the conduit 40, into the passage 16 and further to the fan 30. Below, an example of a required underpressure at the outlet 41 will be discussed with reference to FIG. 4, which is a detailed view of the pressing arrangement 100 shown in FIGS. 1-3. If the static pressure within the furnace chamber is at about 1000 bar and the pressure medium of the passage 16 has a temperature of about 1100° C., the flowing pressure medium in the passage 16 will have a density of about 282 kg/m$^3$. Further, if the pressure medium in the cold region 42 has a temperature of about 150°, the density will be about 742 kg/m$^3$. In this example embodiment, the distance, x, between the outlet 41 of the conduit 40 and the inlet 14 is 250 mm. Therefore, the pressure difference required to initiate a flow of pressure medium through the conduit 40 will be about 11 mbar or 1128 Pa. The pressure difference can be influenced by increasing the distance between the outlet 41 of the conduit 40 and the inlet 16, i.e. by increasing the distance x. That is, the certain limit number of revolutions will be higher, which entails that the fan 30 can be operated at higher number of revolutions without initiating the enhanced cooling effect provided by the cold pressure medium flowing through the conduit 40 and mixes with the warm pressure medium flowing in the passage 16.

With reference to FIGS. 5-8, further embodiments of the present invention will be discussed. The same reference numerals are used in FIGS. 5-8 for corresponding features or portions of the pressure vessel shown in FIG. 1. Further, the description of these features or portions will be omitted below.

Figure 5:
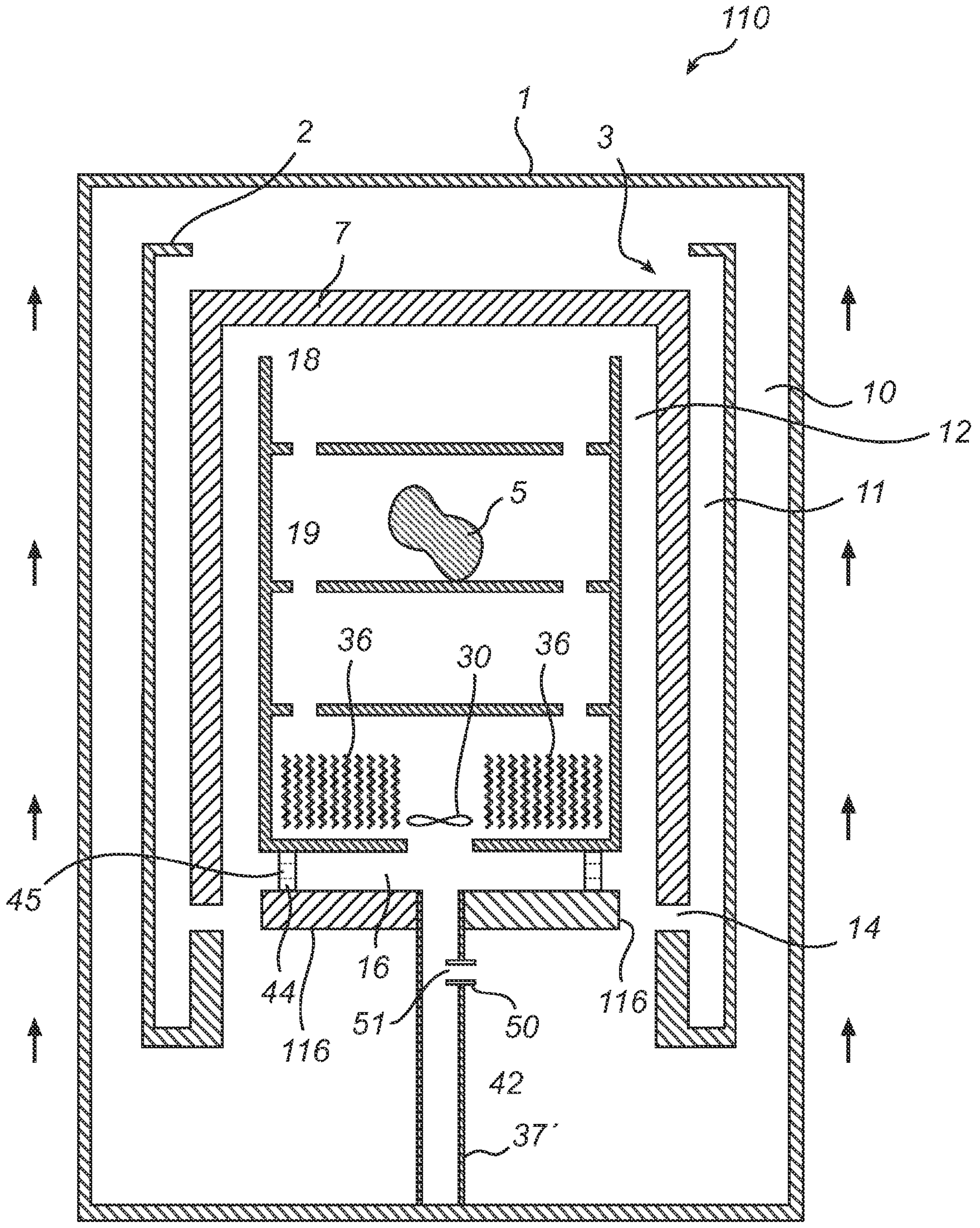
FIG. 5 shows a schematical side view of a pressing arrangement according to another embodiment of the present invention.

First, with reference to FIG. 5, an embodiment of a pressing arrangement 110 where a feeding conduit 50 is arranged in wall of a central passage 37' instead of the bottom insulation portion 116 will be discussed. The feeding conduit 50 is arranged in the central passage 37' in a section beneath the bottom insulation portion 116 such that an outlet 51 of the feeding conduit 50 is located in the central passage 37'. Cold pressure medium can thereby be fed from the cold region 42 to the fan 30 for mixing with flow of pressure medium from the passage 16 via the central passage 37' by adjusting the number of revolutions of the fan 30 in a corresponding manner as has been described above. Similarly, as has been described above, by operating the fan 30 at a number of revolutions being lower the certain limit number of revolutions for this particular embodiment under given temperature and pressure conditions a steady-state state can be maintained.

Figure 6:
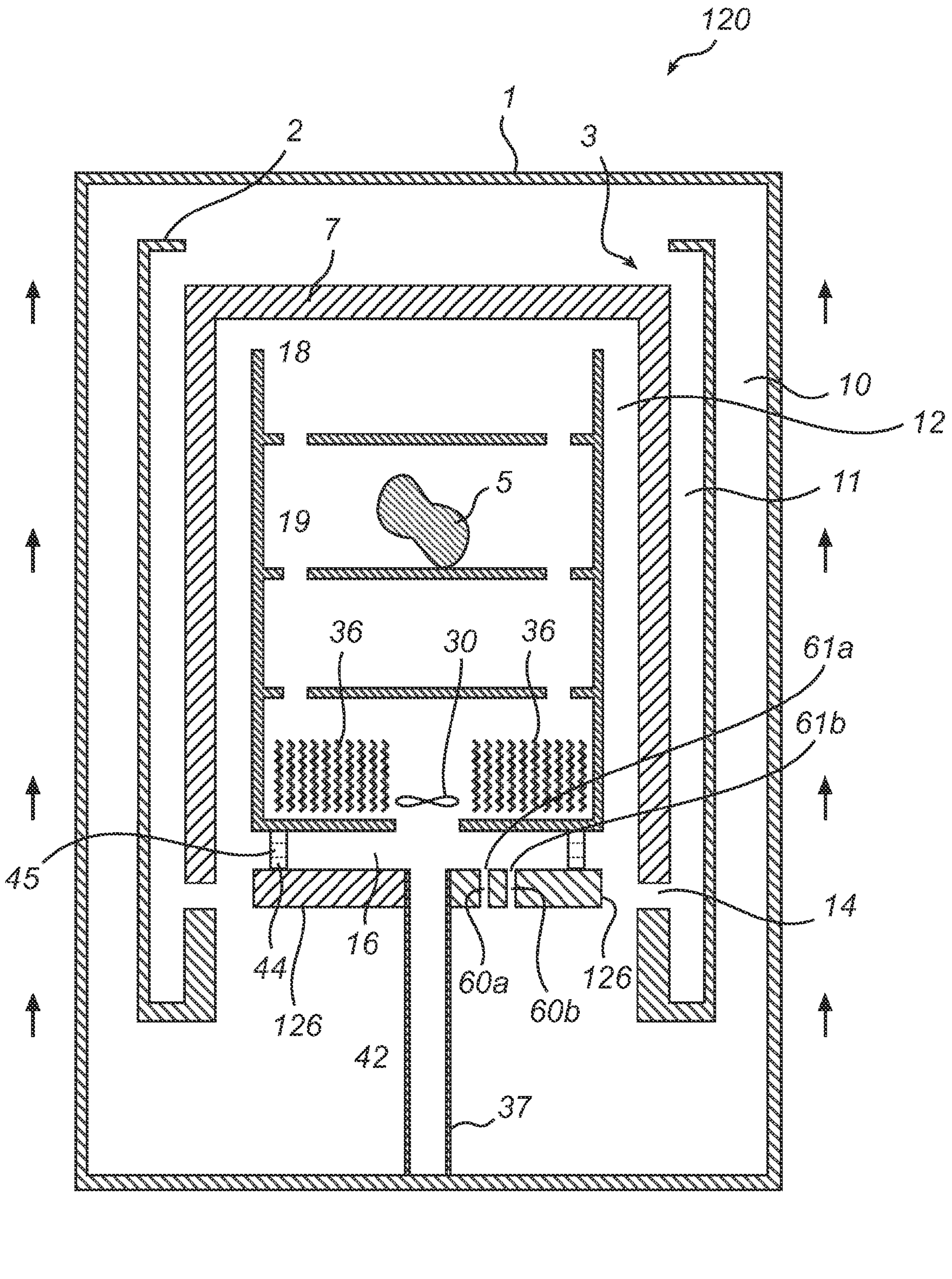
FIG. 6 shows a schematical side view of a pressing arrangement according to yet another embodiment of the present invention.

Referring now to FIG. 6, yet another embodiment of the present invention will be discussed. In this embodiment of a pressing arrangement 120, the pressure vessel 1 includes a bottom insulation portion provided with two feeding conduits 60*a* and 60*b*. The feeding conduits 60*a* and 60*b* are arranged in the bottom insulation portion 126 such that their respective outlet 61*a* and 61*b* is located in the passage 16. By adjusting the number of revolutions of the fan 30, the flow of cold pressure medium from the cold region 42 into the passage 16 via conduits 60*a* and 60*b* and further to the fan 30 for mixing with the flow of warm pressure medium from the passage 16 can be controlled in a corresponding manner as has been described above.

Figure 7:
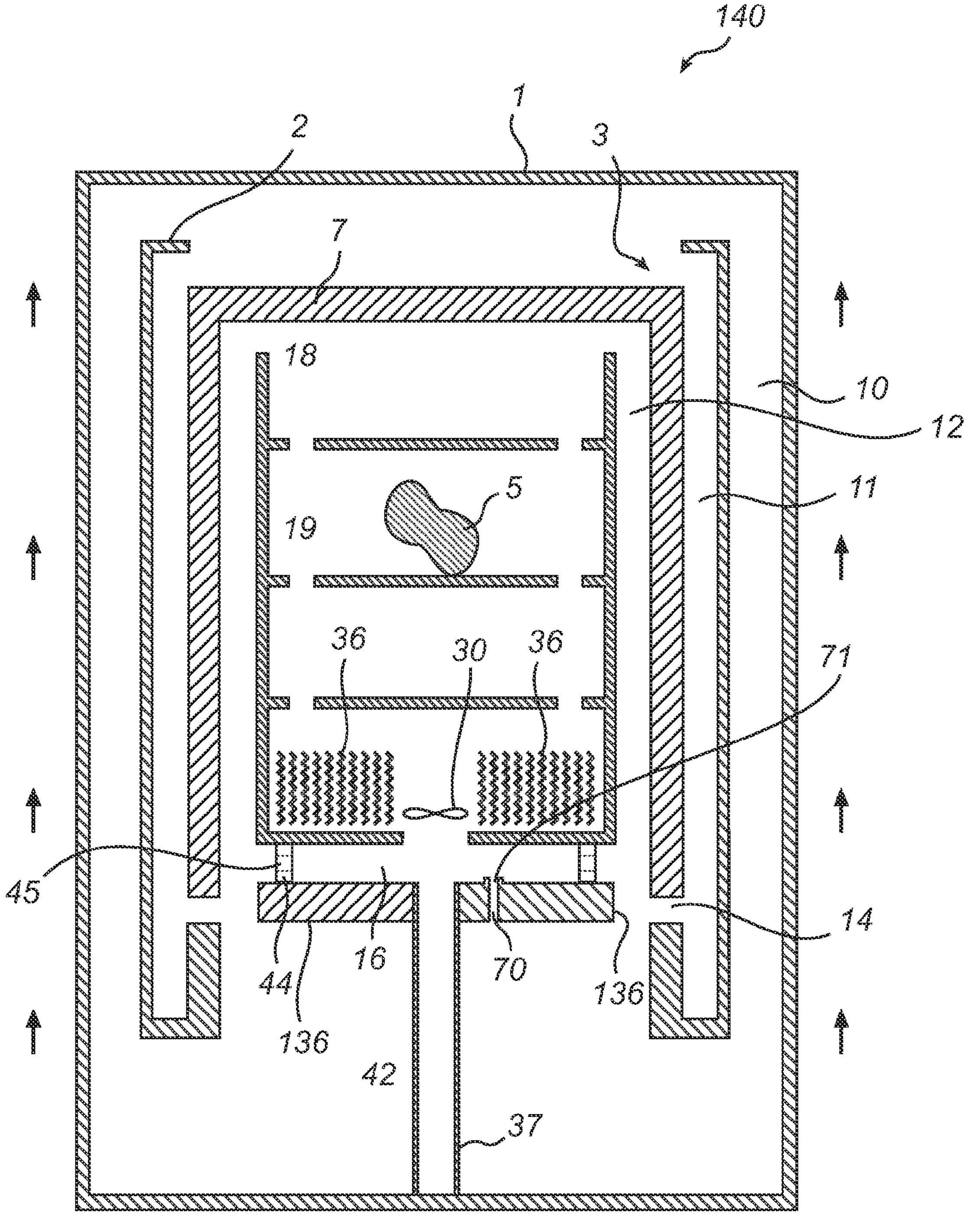
FIG. 7 shows a schematical side view of a pressing arrangement according to still another embodiment of the present invention.

Referring now to FIG. 7, a further embodiment of the present invention will be discussed. In this embodiment of a pressing arrangement 130, the pressure vessel 1 includes a bottom insulation portion 136 provided one feeding conduit 70. The feeding conduit 70 is arranged in the bottom insulation portion 136 such an outlet 71 is located in the passage 16. However, in this embodiment, the conduit 70 is extended into the passage 16 and the outlet 71 will hence be located at a distance from the bottom insulation portion 136. By adjusting the number of revolutions of the fan 30, the flow of cold pressure medium from the cold region 42 into the passage 16 via conduits 60*a* and 60*b* and further to the fan 30 for mixing with the flow of warm pressure medium from the passage 16 can be controlled in a corresponding manner as has been described above.

Figure 8:
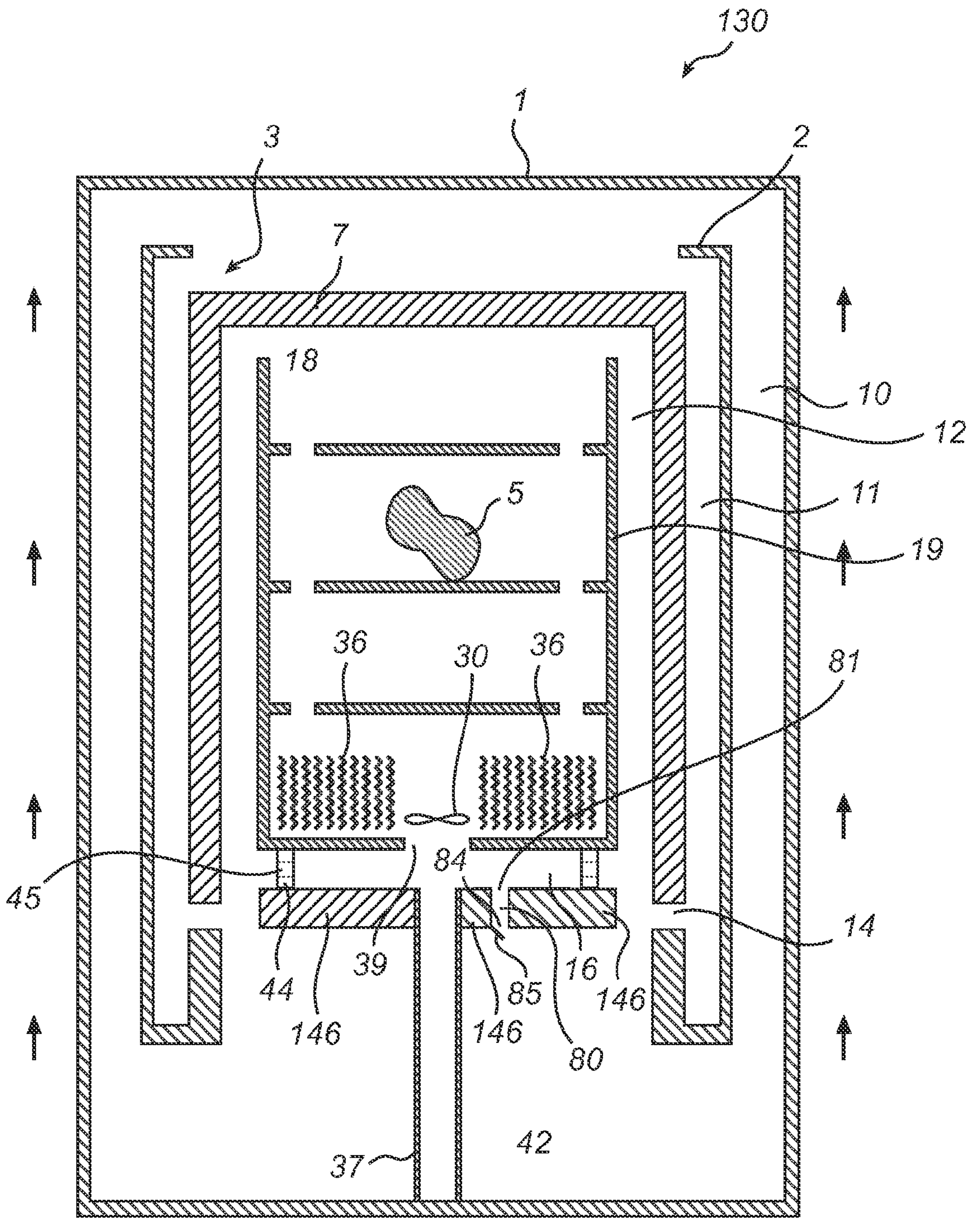
FIG. 8 shows a schematical side view of a pressing arrangement according to a further embodiment of the present invention.

With reference now to FIG. 8, still another embodiment of the present invention will be discussed. In this embodiment of a pressing arrangement 140, the pressure vessel 1 includes a bottom insulation portion 146 provided one feeding conduit 80 arranged in the bottom insulation portion 146 such an outlet 81 is located in the passage 16. The feeding conduit 80 is provided with a valve 85 at an inlet 84. When the valve 85 is open, this embodiment of the present invention will function as the embodiment described with reference to FIG. 1. However, the valve 85 enables an instant throttling of the feeding conduit 80 during a cooling state, i.e. during a state where fan 30 is operated at a number of revolutions above the certain limit number of revolutions such that cold pressure medium flows through the feeding conduit 80 and mixes with pressure medium passing through the passage 16 above the bottom insulation portion 146. Thereby, it is possible to e.g. control the mixing ration between cold and warm pressure medium very accurately by opening/closing the valve 85.

Even though the present description and drawings disclose embodiments and examples, including selections of components, materials, temperature ranges, pressure ranges, etc., the invention is not restricted to these specific examples. Numerous modifications and variations can be made without departing from the scope of the present invention, which is defined by the accompanying claims.

The invention claimed is:

1. A pressing arrangement for hot pressing, comprising:

a pressure vessel including a furnace chamber adapted to hold articles, which furnace chamber is provided inside the pressure vessel;

a heat insulated casing arranged to surround said furnace chamber;

a bottom insulating portion arranged beneath said furnace chamber;

a fan having an adjustable number of revolutions, said fan being arranged to provide a flow of pressure medium into said furnace chamber and a circulation of said pressure medium within the furnace chamber when operated; and at least one valveless feeding passage having an outlet located at a radial and vertical distance relative said fan, said at least one valveless feeding passage being arranged to provide a connection during at least a steady state and a cooling state between a region, inside said pressure vessel and beneath said bottom insulating portion, and an inlet of said fan so as to enable, by increasing the number of revolutions of said fan to generate a sufficient pressure difference between said region and a passage above said bottom insulating portion and below said furnace chamber, a flow of pressure medium from said region to said inlet for mixing said flow from said region with a flow of pressure medium in said passage, wherein said flow can be controlled by adjusting said number of revolutions of said fan, wherein said at least one valveless feeding passage is at least one conduit arranged in said bottom insulating portion at a radial distance from a central axis of said fan and wherein a respective outlet of said conduit is located in connection to a passage above said bottom insulating portion.

2. The pressing arrangement according to claim 1, wherein said fan is configured such that operation at a number of revolutions below a certain limit number of revolutions results in that said flow of pressure medium is impeded.

3. The pressing arrangement according to claim 2, wherein said fan is configured such that operation at a variable number of revolutions above said certain limit number of revolutions results in a variable flow of cold pressure medium through said at least one valveless feeding passage towards said inlet of said fan, wherein the amount of cold pressure medium fed into said furnace chamber can be varied.

4. The pressing arrangement according to claim 3, wherein said at least one valveless feeding passage is arranged with dimensions such that said fan and said at least one valveless feeding passage co-operate to achieve said substantially impeded flow of pressure medium and said variable flow of cold pressure medium, respectively.

5. The pressing arrangement according to claim 3, wherein said respective outlet of said at least one valveless feeding passage is located at a radial and vertical distance from an inlet of a guiding passage in said heat insulated casing such that said at least one valveless feeding passage and said inlet of said guiding passage co-operate to achieve said substantially impeded flow of pressure medium and said variable flow of cold pressure medium.

6. The pressing arrangement according to claim 1, wherein said at least one conduit is arranged to extend into said passage such that said respective outlet is located at a distance from said bottom insulation portion.

7. The pressing arrangement according to claim 1, wherein said at least one valveless feeding passage is arranged such that a respective outlet of said valveless feeding passage is located in connection to said central passage.

8. The pressing arrangement according to claim 1, wherein support means for supporting a load compartment within said furnace chamber is arranged such that pressure medium is allowed to flow into said passage above said bottom insulation portion.

9. The pressing arrangement according to claim 8, wherein said support means is provided with through holes arranged to allow pressure medium to flow into said passage above said bottom insulation portion.

10. A pressing arrangement for hot pressing, said pressing arrangement comprising:

a pressure vessel including a furnace chamber adapted to hold articles, which furnace chamber is provided inside the pressure vessel;

a heat insulated casing arranged to surround said furnace chamber;

a bottom insulating portion arranged beneath said furnace chamber;

a fan having an adjustable number of revolutions, said fan being arranged to provide a flow of pressure medium into said furnace chamber and a circulation of said pressure medium within the furnace chamber when operated; and at least one valveless feeding passage having an outlet located at a radial and vertical distance relative said fan, said at least one valveless feeding passage being arranged to provide a connection during at least a steady state and a cooling state between a region, inside said pressure vessel and beneath said bottom insulating portion, and an inlet of said fan, so as to enable, by increasing the number of revolutions of said fan to generate a sufficient pressure difference between said region and a passage above said bottom insulating portion and below said furnace chamber, a flow of pressure medium from said region to said inlet wherein adjusting said number of revolutions of said fan results in said flow being mixed with a flow of pressure medium in said at least one valveless feeding passage, wherein said at least one valveless feeding passage is at least one conduit arranged in said bottom insulating portion at a radial distance from a central axis of said fan and wherein a respective outlet of said conduit is located in connection to a passage above said bottom insulating portion.

* * * * *